No. 898,416. PATENTED SEPT. 8, 1908.
W. C. WATSON.
DROP LEVER BRAKE FOR RAILWAY VEHICLES.
APPLICATION FILED MAR. 16, 1908.

Witnesses:  Inventor
William C. Watson
By James L. Norris

UNITED STATES PATENT OFFICE.

WILLIAM CHARLES WATSON, OF COTTESLOE, WESTERN AUSTRALIA, AUSTRALIA, ASSIGNOR OF ONE-THIRD TO HARRY BOLTON AND ONE-THIRD TO DANIEL MULCAHY, OF FREMANTLE, WESTERN AUSTRALIA, AUSTRALIA.

DROP-LEVER BRAKE FOR RAILWAY-VEHICLES.

No. 898,416.     Specification of Letters Patent.     Patented Sept. 8, 1908.

Application filed March 16, 1908. Serial No. 421,515.

*To all whom it may concern:*

Be it known that I, WILLIAM CHARLES WATSON, a subject of the King of Great Britain, residing at Cottesloe, in the State of Western Australia and Commonwealth of Australia, have invented certain new and useful Improvements in Drop-Lever Brakes for Railway-Vehicles, of which the following is a specification.

This invention relates principally to the brake gear of railway trucks and it provides means whereby the brake lever may be readily dropped outside of the line of rail and without any danger to the shunter as is now the case and further by its use it minimizes the evils resulting from breakaway trucks and such like accidents.

The means consist in an improvement to the present brake gear and said improvement effects a rapid release for throwing the brake into action and it consists of a curved pivoted arm whose working terminal is made in the form of a tooth or detent which engages into a corresponding notch formed on the back edge of the usual vertical catch bar and said tooth is provided with an urging spring.

In order that the construction and operation of this invention may be clearly understood reference will now be made to the attached drawings in which:—

Figure 1:
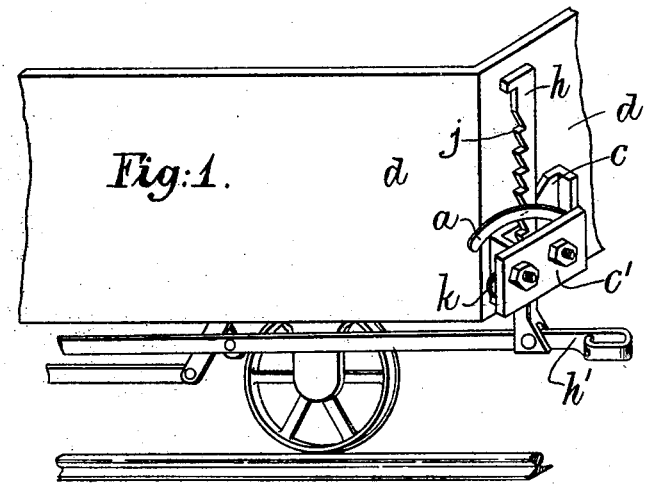
Figures 2, 3:
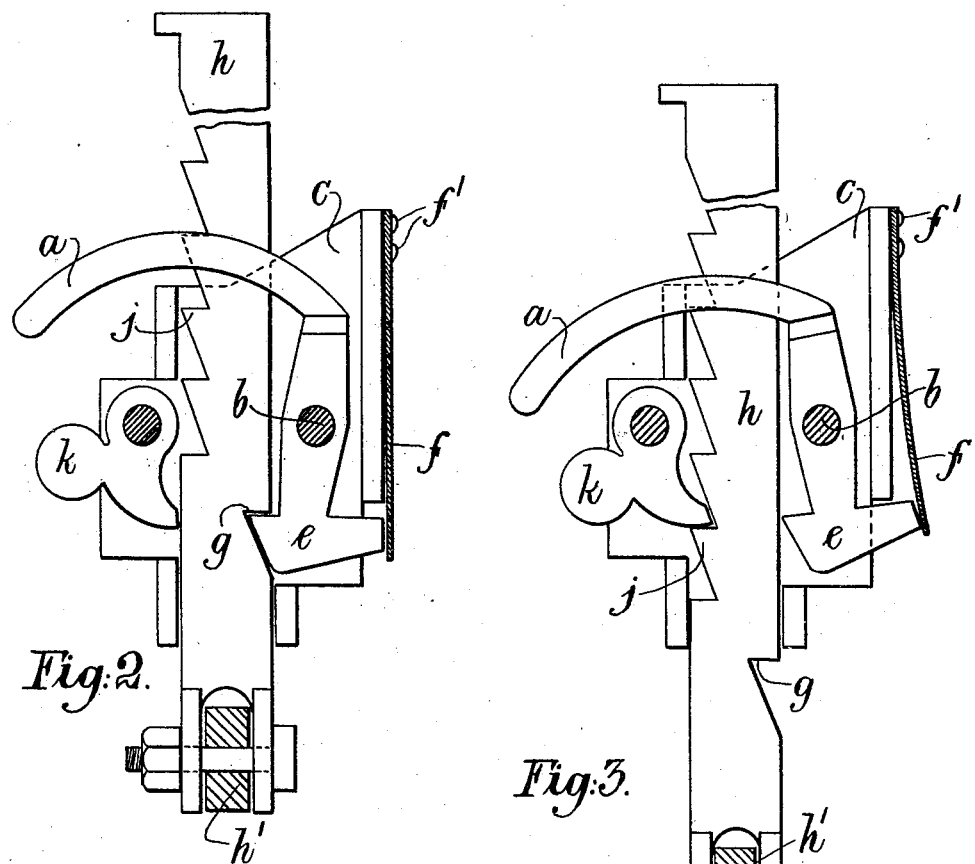

Figure 1 shows the brake as operatively attached to a truck. Fig. 2 is a face view of the brake in its engaged position. Fig. 3 is a similar view but as in the disengaged position.

In said drawings *a* is the curved arm pivoted at *b* to the box or casing *c* having the removable face plate *c′* and which box is secured to the truck *d* as shown in Fig. 1. The working terminal of this pivoted arm is made in the form of a tooth or detent *e* and provided with an urging spring *f* whose duty is to urge and hold the tooth *e* in its engagement in the notch *g* of the serrated bar *h* and so lock said bar in its idle or free position and as seen in Fig. 2, said bar being connected to the operative lever *h′*. This notch *g* is formed in the usual bar *h* as in use on trucks and which bar is formed with the serrations *j* for engagement with the locking pawl *k* but said bar or pawl or lever *h′* forms no part of this invention.

The urging spring *f* is secured to the box *c* by the set bolts *f′*. In lieu of using an urging spring as *f* the detent as *e* may be made of sufficient weight as to cause the arm *a* to fall and engage by gravity in the notch *g*.

In order to apply the brake the arm *a* is given a downward knock or blow and, from the outside to the line of rail which blow causes the bar *h* and lever *h′* to be rapidly released and lowered as seen in Fig. 3 and the brake blocks brought into action against the wheel. When the bar *h* is lowered and the brake consequently applied the urging spring *f* causes the tooth *e* to press against the back face of the bar *h* and be ready to engage with the notch *g* and as seen in Fig. 3. It will be seen that striking the arm *a* throws the brake gear into action while the urging spring maintains the opposite result. To release the brake the pawl *k* is disengaged and the bar *h* and lever *h′* is raised and held in such released position by the tooth *e* and notch *g* and as seen in Fig. 2.

What I claim as my invention and desire to secure by Letters Patent is:—

1. In brake devices, in combination, a bar forming an element of brake operating means, a casing, a second bar operatively connected to said first named bar and movable through the casing vertically thereof, said second bar having a notch in its rear face, and a lever pivoted in the casing at one side of the second bar, said lever having a tooth formed at its lower end to engage in the notch and sustain the second bar, and having its upper end projecting angularly as an operating handle beyond the casing.

2. In brake devices, in combination, a bar forming an element of brake operating means, a casing, a second bar operatively connected to said first named bar and movable through the casing vertically thereof, said second bar having a notch in its rear face, a lever pivoted in the casing at one side of the second bar, said lever having a tooth formed at its lower end to engage in the notch and sustain the second bar and having its upper end projecting angularly as an operating handle beyond the casing, and a spring secured to the casing and bearing against the toothed end of said lever, to cause the same to lie in contact with the rear face of said second bar and to engage in the notch.

In testimony whereof I have hereunto set my hand in presence of two subscribing witnesses.

WILLIAM CHARLES WATSON.

Witnesses:
RICHARD SPARROW,
ROSS EAST.